No. 720,299. PATENTED FEB. 10, 1903.
H. SWANTON.
MEANS FOR CONTROLLING FLUID PRESSURE ENGINES.
APPLICATION FILED OCT. 11, 1897.
NO MODEL. 4 SHEETS—SHEET 1.
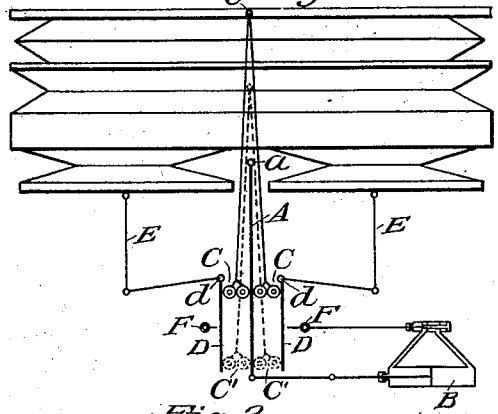
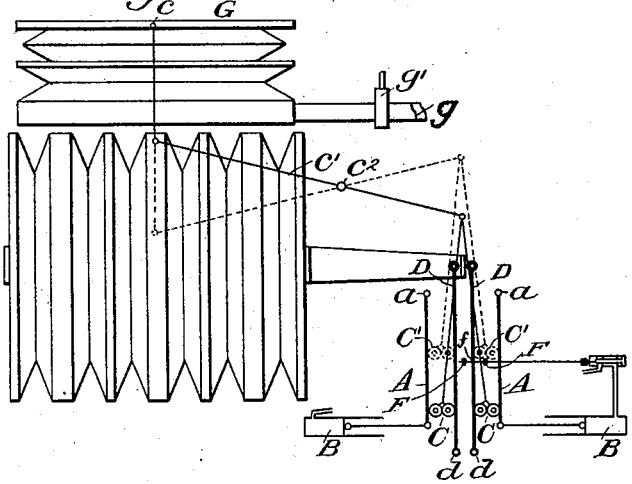
Witnesses. Inventor.

No. 720,299. PATENTED FEB. 10, 1903.
H. SWANTON.
MEANS FOR CONTROLLING FLUID PRESSURE ENGINES.
APPLICATION FILED OCT. 11, 1897.
NO MODEL. 4 SHEETS—SHEET 2.

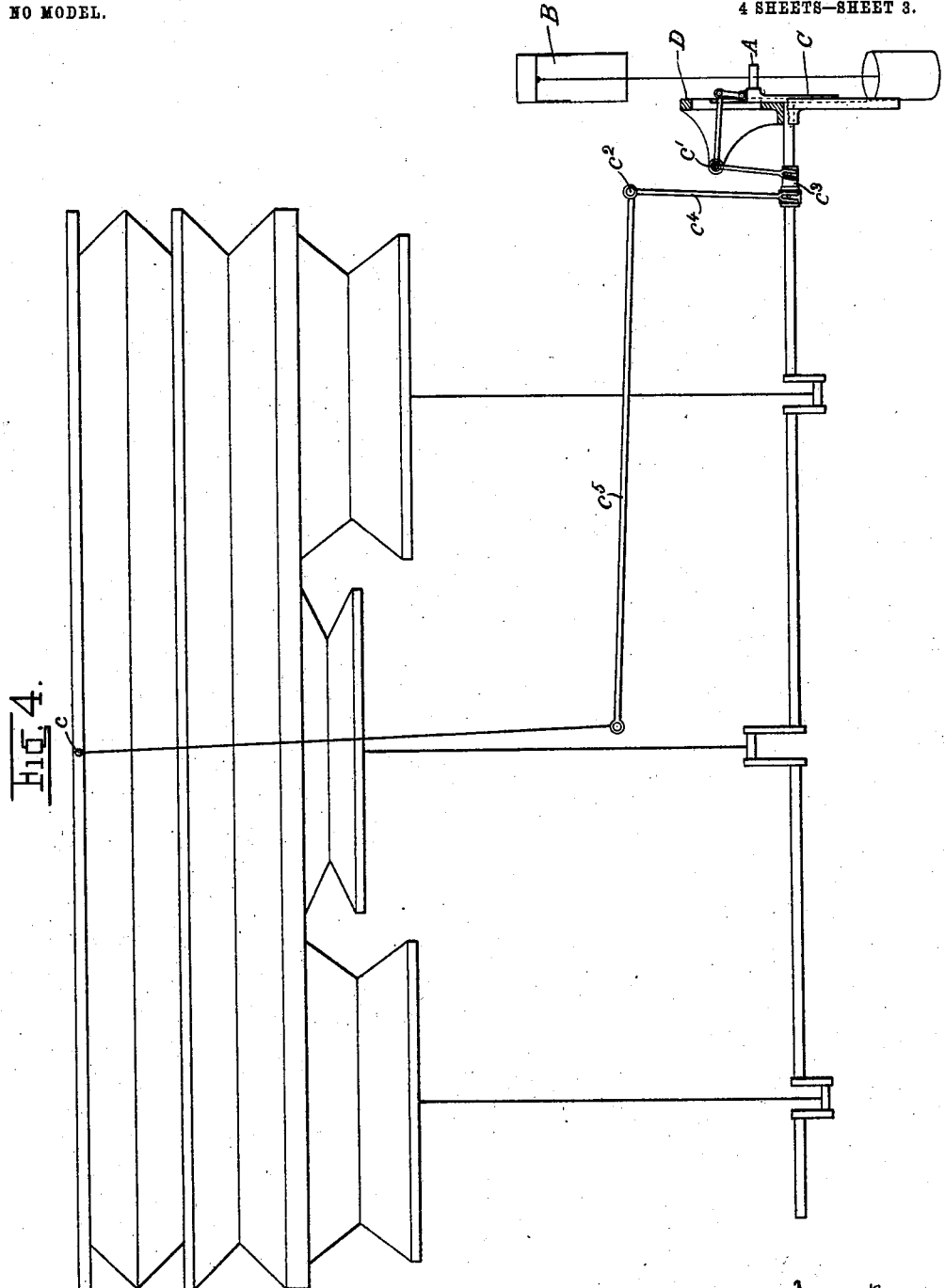

No. 720,299. PATENTED FEB. 10, 1903.
H. SWANTON.
MEANS FOR CONTROLLING FLUID PRESSURE ENGINES.
APPLICATION FILED OCT. 11, 1897.
NO MODEL. 4 SHEETS—SHEET 4.

WITNESSES: Isabella Waldron. Adelaide Claire Gleason.

INVENTOR
Hugh Swanton
BY
ATTORNEYS

UNITED STATES PATENT OFFICE.

HUGH SWANTON, OF LONDON, ENGLAND.

MEANS FOR CONTROLLING FLUID-PRESSURE ENGINES.

SPECIFICATION forming part of Letters Patent No. 720,299, dated February 10, 1903.

Application filed October 11, 1897. Serial No. 676,030. (No model.)

*To all whom it may concern:*

Be it known that I, HUGH SWANTON, a subject of the King of Great Britain, residing at 79 White Horse street, Stepney, London, in the county of Middlesex, England, have invented a novel Means for Controlling Fluid-Pressure Engines, (for which I have obtained a patent in Great Britain, No. 3,822, bearing date February 20, 1896,) of which the following is a specification.

The invention consists in the features hereinafter described, and particularly pointed out in the claims.

The drawings herewith are in diagrammatic form in order to more clearly show the principles involved in my invention.

Figure 2:
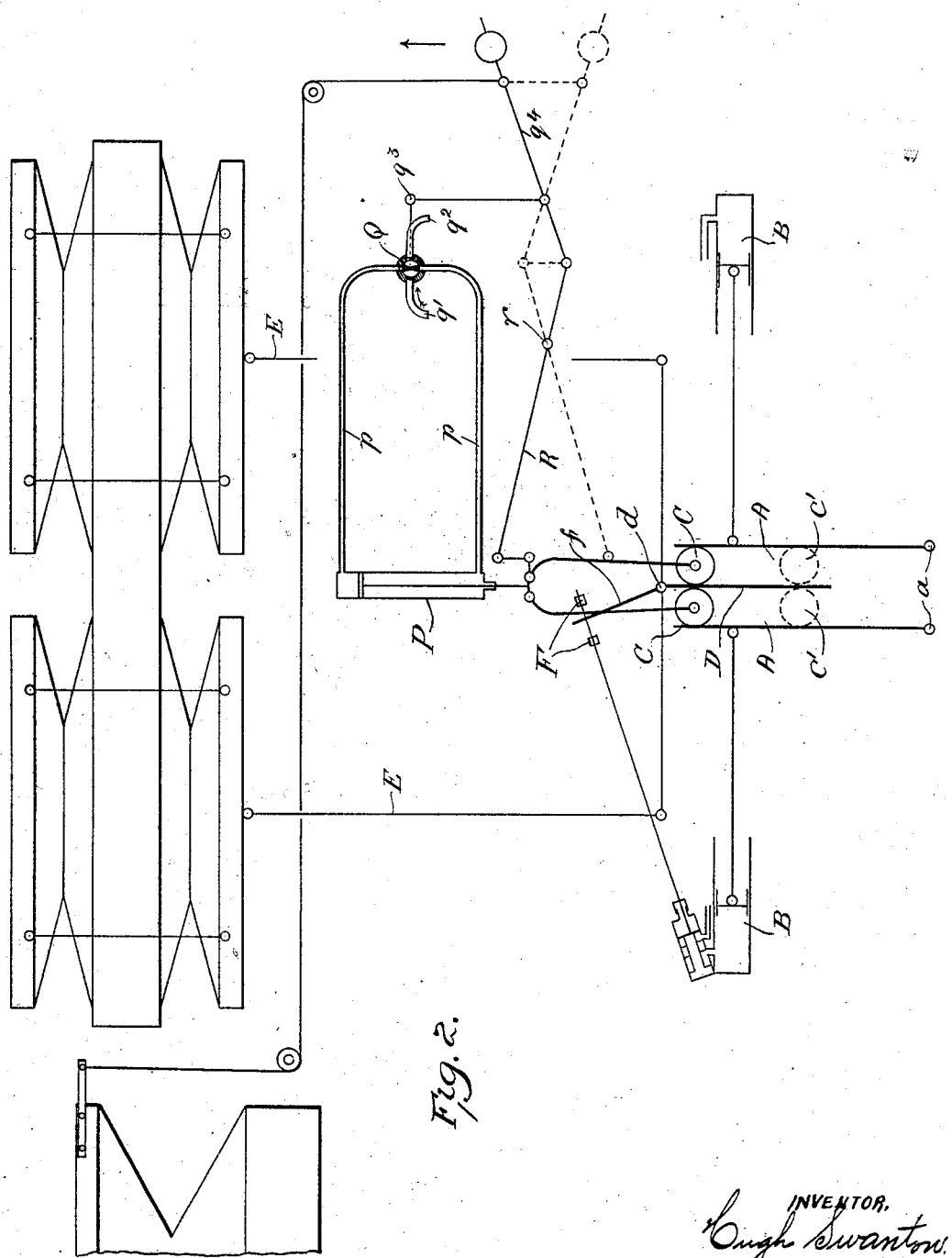
Figure 6:
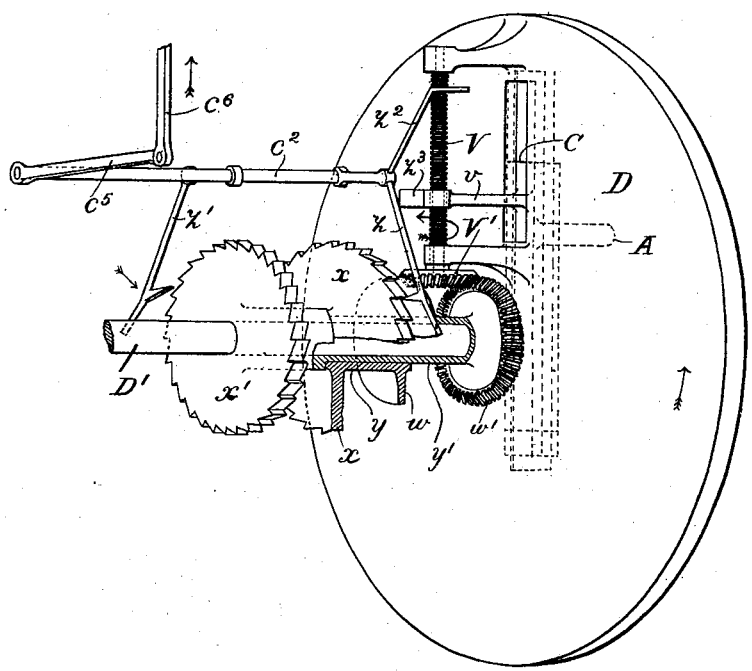
Figure 5:
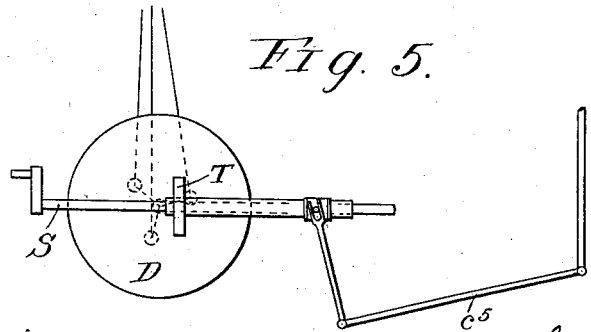

Figure 1 is an elevation of a bellows fitted with two parallel-acting feeders with a diagrammatic illustration of my novel method of control. Fig. 2 is an elevation of four parallel-acting feeders coupled in pairs with a diagrammatic illustration of my novel method of control. Fig. 3 is an elevation of horizontally-acting French feeders with a diagrammatic illustration of my novel method of control. Fig. 4 is an elevation of a bellows fitted with three hinged feeders with a diagrammatic illustration of my novel method of control. Fig. 5 is an end diagrammatic view of my novel method of control as applied to three hinged feeders. Fig. 6 is a perspective view of my novel method of control as applied to three hinged feeders.

Similar letters apply to similar parts throughout the several arrangements.

Figure 1 shows an arrangement operating a common type of vertically-acting feeders at half-stroke. A is a pendulum-lever fulcrumed at $a$, coupled to and operated by an engine B. C C are travelers coupled at $c$ in any convenient manner, coupled to and rising and falling with the top of the reservoir, shown in their highest position in the drawings, and falling with the reservoir to the position shown in dotted lines C' C'. D D are bell-crank levers fulcrumed at $d\ d$, which operate feeders through the thrust-rods E E. It will be observed that the angle of the bell-crank is less than the ordinary ninety degrees. The feeder resistance, which is considerably greater in the open position, may by this means be almost equalized with economy of energy and with smoother action. Attached to the valve-rod of the engine are tappets F F, which are engaged by the pendent arms of the bell-crank levers D D, thereby determining the travel of the feeders.

The action of the apparatus is as follows: The bellows being empty, the travelers C C are in their lowest position C' C', and the leverage is therefore in favor of the engine, the stroke of the engine being slightly in excess of the travel of the feeders. On the starting-valve being opened fluid under pressure has free and unrestricted access to and egress from the engine, which responds, oscillating the lever A to its maximum stroke and by means of the travelers C C rocking the bell-crank levers D D and thereby operating the feeders. The pendent arms of the bell-crank levers D D near the termination of their travel engage the tappets F F, thereby reversing the engine at a certain invariable position in the travel of the feeders. The reservoir is now being rapidly inflated, drawing upward the travelers C C nearer the fulcrums $d\ d$ of the bell-crank levers D D, thereby enabling a lesser travel of the lever A and a shorter stroke of the engine to fully operate the bell-crank levers D D and feeders. Complete inflation of the reservoir draws up the travelers C C to a position on the pendent arms of the bell-crank levers D D near the fulcrums $d\ d$, lessening still further the travel of the lever A and stroke of the engine, in which the resistance of the feeder almost balances the thrust of the engine, which then continues moving at a sufficient speed to supply the inherent waste or wind-leakage, the travel of the feeders remaining constant. A small demand on the compressed air in the reservoir causes it to subside, lowering the travelers C C to a position on the pendent arms of the bell-crank levers D D farther from the fulcrums $d\ d$, thereby increasing the travel of the lever A and stroke of the engine. The increase of leverage in favor of the engine causes an acceleration of speed sufficient to supply the demand. A larger demand on the compressed air in the reservoir brings about a proportionate lengthening of stroke and an acceleration in the speed of the engine in the same manner, the apparatus working at its highest speed and delivering its maximum quantity of compressed air when the travelers C C are near the bottom of the pendent arms of the bell-crank levers D D, the stroke of the engine being then almost at its maximum. A cessation of the demand restores the position of the travelers C C, as described with reference to the full inflation.

The pressure in the mains often fluctuates considerably, and in the foregoing it has been assumed to be at or about its maximum. A fall of pressure in the main will result in a reduction in the power of the engine. Consequently the reservoir will subside and the travelers C C will automatically adjust themselves at a proportionately-greater distance from the fulcrums $d\,d$ of the pendent arms of the bell-crank levers D D, thereby lengthening the stroke of the engine as required to meet the said reduction in pressure, so that and at all times the energy of the fluid under pressure is utilized to the greatest possible advantage.

Fig. 2 shows another common arrangement, consisting of four vertically-acting feeders coupled in pairs. In this arrangement the reservoir is usually at a distance, the well area being entirely occupied by feeders. It is therefore necessary to provide independent means to adjust the position of the travelers. This may be conveniently accomplished by hydraulic power. In this example in order to automatically take up wear, thus secure silence, &c., and to avoid alternating strains the motive apparatus is divided. A A are levers fulcrumed at $a\,a$, coupled to and operated by engines B B. D is a T-rocker centered at $d$, (which takes the place of the bell-cranks D D of Fig. 1.) Its horizontal arms operate coupled feeders in the usual manner. Arranged on either side of the pendent arm of the T-rocker D and between it and the levers A A are travelers C C, which are coupled in any convenient manner to and operated by the hydraulic piston P. The hydraulic piston P is controlled by a four-way cock Q, having inlet $q'$ and outlet $q^2$ and connections to cylinder $p\,p$. The arm $q^3$ of the cock is coupled to a floating lever $q^4$, one end of which is weighted and controlled by the reservoir in the usual manner, the other end being coupled to the lever R, which is fulcrumed at $r$ and coupled in any convenient manner to the hydraulic piston P. F F are tappets on the valve-rod of the engines, which are engaged and operated by the arm $f$ of the T-rocker D, one main slide-valve controlling both engines.

The action of the apparatus is as follows: The bellows being empty, the travelers C C are in their lowest position C' C', the stroke of the engines is at its maximum, the levers $q^4$ and R being in their dotted positions, and the cock Q being adjusted to be sufficiently opened to maintain pressure above the piston P. On the starting-valve being opened fluid under pressure has free and unrestricted access to and egress from the engines, which respond, oscillating the levers A A to their maximum stroke and by means of the travelers C C operate the T-rocker D in the manner described with reference to Fig. 1. Near the termination of its stroke the arm $f$ engages the tappets F F, which determine the travel of the feeders, as described with reference to Fig. 1. The distant reservoir is now being rapidly inflated, drawing upward the weighted arm $q^4$ and operating the four-way cock Q so as to close the supply to the pipe $p'$ and open supply to the pipe $p$. Thus pressure is transferred from above to below the piston P, while the pipe $p'$ is now open to exhaust. This causes the piston P to move upward, drawing with it the travelers C C up the pendent arm of the T-rocker D nearer the fulcrum $d$, whereby the stroke of the engines is shortened, as described with reference to Fig. 1, the travel of the feeders remaining constant; but the upward motion of the piston P has operated the lever R, which partly neutralizes the action of the bellows on the lever $q^4$, and consequently moves the cock back toward the closed position, so tending to again cut off pressure from below the piston P. This combined action of the levers R and $q^4$ continues until the reservoir is fully inflated, when the cock Q, under the control of the reservoir, assumes a neutral position, thereby locking the piston P and travelers C C in a position which restricts the stroke, and consequently the speed of the engines, to that necessary to keep the reservoir fully inflated, as described with reference to Fig. 1. It is important that the action of the cock be not too rapid in order that the variations in speed may not be sudden or violent. A demand for compressed air causes the reservoir to subside and operate the cock Q by means of the lever $q^4$, admitting pressure above the piston P and simultaneously relieving pressure from the under side of piston P, which, with travelers C C, is consequently forced downward until the pressure above piston P is cut off and cock Q assumes a neutral position, thereby locking piston P and travelers C C in a position which gives the required acceleration of speed, as described with reference to Fig. 1. A cessation of the demand causes the reservoir to rise and operate the cock Q, thereby adjusting the position of the piston P, travelers C C, and speed of the engines to that sufficient to supply the inherent wind-leakage. It will now be evident that the piston P and travelers C C follow the movements of the reservoir, securing the same result as the rigid coupling described with reference to Fig. 1, and that the effects of varying pressures are identical in results with those described in reference to Fig. 1. This arangement also utilizes the energy of the water in the engines B B to the greatest possible advantage. The quantity of water consumed by the hydraulic controlling apparatus is but small, and in this respect arrangement Fig. 2 is inferior to that shown in Fig. 1.

Fig. 3 shows another arrangement of feeders in common use, consisting of a series of six horizontally-acting feeders rigidly connected to one thrust-bar, a set of three being in simultaneous action. In this example, as in Fig. 2, the motive apparatus is divided. A A are pendulum-levers fulcrumed at $a\ a$, coupled to and operated by engines B B. D D are levers fulcrumed at $d\ d$ and fitted at their upper extremities with rollers, (the levers taking the place of the bell-crank levers D D of Fig. 1.) Between the pendulum-levers A A and levers D D are travelers C C, as before, which are coupled to and operated by the rock-lever $c'$. G is an auxiliary controlling-reservoir operating the travelers C C through the connection $c$ and the rock-lever $c'$, which is fulcrumed at $c^2$. An arm $f$, fixed to either of the levers D D, engages and operates the tappets F F on the valve-rod of the engine.

The action of the apparatus is identical with that described with reference to Figs. 1 and 2 and need not, therefore, be described in detail; but the auxiliary reservoir G may be utilized for the purpose of control in two different ways: First, all the compressed air from the feeders may be passed through it in the ordinary manner, as shown in Fig. 1; secondly, it may fulfil the office of the hydraulic piston described with reference to Fig. 2 and may be considered and used as a large pneumatic lever, with this advantage—i. e., that no compressed air is wasted, and with the further advantage that no chain to or other mechanical connection with a distant reservoir is necessary. In the second method the supply of compressed air from the feeders is directly conveyed to the distant reservoirs of the organ, which are fitted with valves in the ordinary manner, cutting off the supply of compressed air from them when they are fully inflated. A passage for compressed air from the main wind-trunk to and from the large auxiliary reservoir G is provided by the pipe $g$, which is fitted with a choking device $g'$. The reservoir G is weighted in the usual manner and should be sufficiently powerful to control the travelers C C. The speed at which the reservoir G rises and falls can be adjusted by its load and by the choking device $g'$.

The action of the apparatus, arranged as above described, is as follows: The bellows being empty, on water being admitted to the engines they respond, filling the distant reservoirs in the organ. As the valves in the distant reservoirs cut off the supply, the air-pressure in the main wind-trunk, which conveys the wind from the feeders, slightly increases and raising the auxiliary reservoir G reduces the stroke and speed of the engines, as before explained. The auxiliary reservoir G, rising at an easy rate, continues to operate the travelers C C and is aided in checking the speed of the engines by a momentary and slight increase of air-pressure in the feeders themselves. The continued rise of the reservoir G raises the travelers C C and increases the leverage against the engines till the temporary feeder resistance, no longer necessary, ceases. A demand for compressed air causes a diminution of air-pressure in the main wind-trunk. The auxiliary reservoir G subsides under the influence of its load at a rate determined by the choking device $g'$ and moves the travelers C C farther from the fulcrums $a\ a$, and thereby increasing the stroke and speed of the engines at a convenient rate until the demand is satisfied. A cessation of the demand causes the auxiliary reservoir G to rise and repeat the operation, as described above. It will now be evident that the compressed air stored in the auxiliary reservoir G is utilized in the organ, that none is wasted, and that the rate of increase and decrease of speed of the engines can be determined.

Fig. 4 shows the application of the invention to another arrangement in common use, consisting of three hinged feeders operated by a three-throw crank-shaft driven by a rotary engine. In this case the crank-pin may be radially adjustable, its position being determined by the reservoir. The crank-pin so mounted may be considered as the equivalent of the lever A and traveler C of the foregoing arrangements, while the slipper-guides which receive the thrust of the engine and the cranks which operate the feeders may be regarded as equivalent to the bell-crank lever D of Fig. 1. B is a rotary engine, preferably of the three-cylinder type, driving the crank-pin A. The crank-pin A is mounted on a slipper C, which is radially guided on a disk D. Fulcrumed on the disk D is the small bell-crank $c'$, one arm being coupled to and operating the slipper C, the other being forked to engage the collar $c^3$. The collar $c^3$ slides on the main crank-shaft and is connected with the reservoir at $c$ through the forked arm $c^4$, rock-shaft $c^2$, and lever $c^5$. The reservoir is shown in its inflated position, the crank-pin A near the center of the main crank-shaft, the stroke of the engine consequently at its shortest, and the speed just sufficient to supply the inherent wind leakage.

The action of the apparatus is similar to that of the foregoing arrangements, a movement of the reservoir shifting the crank-pin A and increasing or decreasing the stroke and speed of the engine, as required. In some cases a small rotary engine is employed, running at a higher speed than that of the main crank-shaft, to which it is coupled by gearing. For small loads frictional driving appears to be satisfactory, and my method is easily applicable to this system. Fig. 5 illustrates the driving portion of such an arrangement. D is a disk suitably prepared for frictional driving arranged on the end of a three-throw crank-shaft which operates feeders, as in Fig. 4. B is a small rotary engine driving a cross-shaft S. Mounted on the shaft S and suitably connected therewith is a sleeve carrying a driver T. The driver T drives the disk D by friction, and the position of the driver T is determined by the reservoir by means such as the bell-crank $c^5$.

The action of the apparatus is as follows: The reservoir being empty, the driver T will be near the periphery of the disk D, and consequently the leverage will be in favor of the engine. On water being admitted the engine responds. As the reservoir rises it operates the bell-crank $c^5$ and forces the driver T nearer the center of the disk D, thereby increasing the resistance to the engine and reducing its speed. The reservoir will continue to rise and to reduce the speed of the engine until the driver T finds a position on the disk D in which the resistance of the feeders almost balances the effort of the engine, which then continues moving at a speed just sufficient to supply the inherent wind leakage. A movement of the reservoir shifts the position of the driver T on the disk D, increasing or decreasing the speed of the engine, as required.

In the foregoing examples, Figs. 1, 3, 4, and 5, the power adjusting the travelers is furnished by the reservoir and in Fig. 2 by independent hydraulic means; but it may be derived from the engine itself. The arrangement shown in Fig. 4 affords a convenient example.

In Fig. 6, D is the crank-disk, fixed on the shaft D', which is driven by the engine through crank-pin A. This crank-pin A (shown dotted) is mounted on a sliding block or slipper C, carried by crank-disk D. The crank-pin A, through its sliding block and a connecting-arm $v$, is capable of being slid by a screw V to shorten or lengthen the throw of crank. The screw V is mounted on the opposite side of crank-disk D and carries at its lower end a bevel-wheel V', gearing with two bevel-wheels $w$ and $w'$, which are mounted, respectively, on concentric sleeves $y$ and $y'$, upon the ends of which are mounted ratchet-wheels $x$ and $x'$, respectively. The sleeves $y$ and $y'$ are loose on shaft D'. The ratchet-wheels $x$ and $x'$ are adapted to be engaged by locking-pawls $z$ and $z'$, which are controlled by the main air-reservoir by means of lever $c^5$ and rock-shaft $c^2$. Both pawls $z$ and $z'$ should be held in position by suitable springs. (Not shown in the drawings.) The pawl $z$ is provided with an arm $z^2$ in order that an extension $z^3$ of the slipper C may act as a tappet to release the pawl $z$ and ratchet-wheel $x$ when the crank-pin A is at the limit of its outward travel.

The operation is as follows: Assuming the bellows of reservoir to be deflated, the engine will start to drive the crank-disk D and the shaft D', and all the parts V V', $w$ $w'$, $x$ $x'$, and $y$ $y'$ will rotate with the shaft in the direction of the arrow, and the main air-reservoir will be inflated to a predetermined limit, when the rock-shaft $c^2$ will be operated in the direction of the arrow by arm $c^6$ from the bellows and cause the pawl $z'$ to engage the ratchet-wheel $x'$. The pawl $z'$ thus holds the ratchet-wheel $x'$, and with it the miter-wheel $w'$, stationary, while the bevel-pinion V' will still rotate with the crank-disk and other parts. Consequently its engagement with the bevel-wheel $w$ will cause the pinion V' to rotate in the direction of the arrow and through the screw V to travel the slipper C, carrying the crank-pin A, toward the shaft, and so shorten the throw of the crank, therefore decreasing the leverage power and speed of the engine and the rate of supply to the bellows or reservoir. Now as the bellows begin to deflate consequent on the demand of organ being above the supply the arm $c^6$ will fall and operate rock-shaft $c^2$ in the direction of arrow to throw pawl $z'$ out of engagement with ratchet-wheel $x'$ and almost immediately throwing pawl $z$ into engagement with the ratchet-wheel $x$. This ratchet-wheel $x$ is now held together with the bevel-wheel $w$, when the same operation described in reference to pawl $z$ in regard to screw V and slipper C and crank-pin A takes place, but in the reverse direction—that is to say, the throw of crank is lengthened, and therefore increases the power and speed of engine for reinflating the reservoir.

An engine blowing an organ may be stopped by the organist or operator at any moment, and in this arrangement the crank-pin A will remain in that position in which the instant of stoppage finds it. To take an extreme case, for example, it is assumed that the apparatus has been stopped at a period of maximum water-pressure and that the position of crank-pin A is that which limits the engine to its minimum stroke. The organ is now required and the water is assumed, for example, to be at its minimum pressure. Water being admitted finds the engine overpowered, unable to move the feeders at a useful speed and incapable of inflating the reservoir, its speed being obviously restricted to that determined by the inherent wind leakage; but the controlling-gear is in action, continually increasing the stroke and leverage in favor of the engine. This action continues until the power and speed of the engine enable it to inflate the reservoir sufficiently to operate the controlling-gear in the reverse direction, checking the speed of the engine, and thereby determining the limit of inflation. This form of apparatus should be employed in combination with a reservoir fitted with inverted ribs only, and it is assumed in the foregoing description that the reservoir is so constructed.

It will now be seen that the essential features of my invention consist of (A) the elimination of the controlling cock or valve, (B) the free admission of fluid under pressure to and its egress from the engine or engines, and (C) the determining of speed by automatically varying the leverage between engines and feeders, with the object not hitherto accomplished—i. e., the perfect utilization of either constant or fluctuating water-pressures.

Engines as usually proportioned have hitherto been rendered wholly or partially inoperative during periods of unusually low pressure in the mains, and a valuable incidental advantage of my method of control is the absence of inducement to dangerously restrict piston area with a view to economy in the consumption of water, excess of piston area being no longer a source of waste.

Having fully described my invention, what I claim, and desire to secure by Letters Patent of the United States, is—

1. In combination, a main reservoir, a feeder for supplying fluid under pressure to the reservoir, an engine to which motive fluid has free access and egress, adjustable driving connections between the engine and the feeder whereby the action of the feeder may be maintained constant and the stroke of the engine varied as to length and means for controlling said connections from the main reservoir, substantially as described.

2. In combination, a fluid-pressure engine, an air-containing reservoir to be inflated, a feeder for supplying air under pressure to the reservoir, driving connections between the same and the engine whereby the feeder is operated, said connections including an adjustable portion to vary the leverage of the engine on said connections but retaining a constant and uniform stroke of the feeder, connections controlled by the inflation or deflation of the air-containing member to move said adjustable portion, substantially as described.

3. In combination, a main reservoir, a feeder for supplying air under pressure to the reservoir, an engine for operating the feeder, driving connections between the feeder and the engine comprising a pivoted lever with connections to the engine, a pivoted lever connected to the feeder and an adjustable portion comprising a traveler between the pivoted levers and a connection from said travelers to the main reservoir to be moved thereby, as described.

4. In combination, a main reservoir, a feeder for supplying air under pressure to the reservoir, an engine for operating the feeder, driving connections between the feeder and the engine comprising a pivoted lever with connections to the engine, a bell-crank lever connected to the feeder and an adjustable portion comprising a traveler between the pivoted lever and bell-crank, a connection from said traveler to the main reservoir to be moved thereby and the tappets with connections to the engine-valves, said tappets being operated by a part of the said connections, as described.

5. In combination, the main reservoir, a feeder for supplying air under pressure to the reservoir, an engine, a bell-crank lever connected with the feeder, a pendulum-lever connected with the engine, an adjustable traveler between the pendulum and bell-crank lever, a connection from said traveler to the main reservoir to be controlled thereby, and a tappet arranged to be operated by the bell-crank lever and connected with the engine-valve to operate the same, as described.

6. In controlling fluid-pressure engines for blowing organs, the combination with the main wind-reservoir and the operating-engine, of a pendulum-lever oscillated by the piston of the engine, bell-crank levers, thrust-rods for connecting said levers to the bellows, feeders, travelers transmitting motiom from the pendulum-lever to said bell-crank levers, means for connecting the main wind-reservoir to said travelers so that according to the demand upon the main reservoir for wind or variation of fluid-pressure in the engine causing diminution of supply to the main reservoir, the travelers are shifted and the oscillation of the pendulum or other levers is correspondingly varied, thereby controlling the stroke of the engine in exact proportion to the demand, substantially as and for the purpose set forth.

HUGH SWANTON.

Witnesses:
WILLIAM LEADER,
RICHARD BURT.